(12) United States Patent
Kim (10) Patent No.: US 11,475,752 B2
(45) Date of Patent: Oct. 18, 2022

(54) NETWORK SYSTEM, VEHICLE AND CONTROL METHOD THEREOF

(71) Applicants: Hyundai Motor Company, Seoul (KR); Kia Motors Corporation, Seoul (KR)

(72) Inventor: Dae Young Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 239 days.

(21) Appl. No.: 16/915,147

(22) Filed: Jun. 29, 2020

(65) Prior Publication Data

US 2021/0174661 A1 Jun. 10, 2021

(30) Foreign Application Priority Data

Dec. 6, 2019 (KR) .................. 10-2019-0161635

(51) Int. Cl.
| | |
|---|---|
| *G08B 21/02* | (2006.01) |
| *B60R 25/31* | (2013.01) |
| *B60R 25/104* | (2013.01) |
| *B60R 25/01* | (2013.01) |
| *B60R 25/34* | (2013.01) |
| *B60R 25/25* | (2013.01) |
| *B60H 1/00* | (2006.01) |
| *B60R 25/102* | (2013.01) |
| *B60R 25/10* | (2013.01) |

(52) U.S. Cl.
CPC .......... *G08B 21/02* (2013.01); *B60H 1/00878* (2013.01); *B60R 25/01* (2013.01); *B60R 25/102* (2013.01); *B60R 25/104* (2013.01); *B60R 25/25* (2013.01); *B60R 25/31* (2013.01); *B60R 25/34* (2013.01); *G08B 21/0205* (2013.01); *B60R 2025/1016* (2013.01)

(58) Field of Classification Search
CPC ........ B60H 1/00878; B60R 2025/1016; B60R 25/01; B60R 25/102; B60R 25/104; B60R 25/25; B60R 25/31; B60R 25/34; G08B 21/02; G08B 21/0205
See application file for complete search history.

(56) References Cited

U.S. PATENT DOCUMENTS

| | | | | |
|---|---|---|---|---|
| 6,153,928 | A * | 11/2000 | Cho .................... | H01L 25/0657 257/692 |
| 8,655,547 | B1 * | 2/2014 | Steele .................... | B60N 2/002 701/49 |
| 8,836,491 | B2 * | 9/2014 | Rao .................... | B60H 1/00978 340/426.26 |

(Continued)

*Primary Examiner* — Nay Tun
(74) *Attorney, Agent, or Firm* — Fox Rothschild LLP (57) ABSTRACT

A vehicle and a network system are provided to operate the air conditioning apparatus of the vehicle when a passenger within the vehicle is left unattended. The vehicle transmits a signal via a vehicle network to rescue the rear passenger, thereby ensuring passenger safety. The vehicle includes an output device and a communicator configured to communicate with a user terminal, an air conditioner, a sensor. The sensor obtains a movement of the passenger and a controller outputs an identification image through the output device when a movement signal of the passenger exceeds a reference signal after the vehicle doors are closed.

11 Claims, 11 Drawing Sheets

(56) References Cited

U.S. PATENT DOCUMENTS

| | | | | |
|---|---|---|---|---|
| 8,844,811 | B1* | 9/2014 | Rogers | G07C 9/00174 |
| | | | | 235/382 |
| 9,000,907 | B1* | 4/2015 | Rembach | B60N 2/002 |
| | | | | 340/565 |
| 9,990,787 | B2* | 6/2018 | Capaldi-Tallon | |
| | | | | G06K 19/06037 |
| 9,998,899 | B1* | 6/2018 | Tannenbaum | G08B 21/0269 |
| 10,946,716 | B2* | 3/2021 | Ireri | B60H 1/00778 |
| 2003/0201894 | A1* | 10/2003 | Li | B60N 2/002 |
| | | | | 340/457 |
| 2006/0291697 | A1* | 12/2006 | Luo | G06V 40/103 |
| | | | | 382/104 |
| 2012/0280790 | A1* | 11/2012 | Gerhardt | H04M 1/72415 |
| | | | | 340/5.61 |
| 2013/0257590 | A1* | 10/2013 | Kuenzi | G07C 9/00174 |
| | | | | 340/5.65 |
| 2015/0306940 | A1* | 10/2015 | Salter | B60H 1/00742 |
| | | | | 701/49 |
| 2016/0167479 | A1* | 6/2016 | Morin | B60H 1/00742 |
| | | | | 701/48 |
| 2018/0050575 | A1* | 2/2018 | Campbell | B60H 1/00978 |
| 2018/0281709 | A1* | 10/2018 | Mendez | B60N 2/002 |
| 2021/0012126 | A1* | 1/2021 | Porta | G06V 40/18 |
| 2021/0279977 | A1* | 9/2021 | Sullivan | G07C 5/008 |

* cited by examiner

NETWORK SYSTEM, VEHICLE AND CONTROL METHOD THEREOF

CROSS-REFERENCE TO RELATED APPLICATION

This application is based on and claims priority under 35 U.S.C. § 119 to Korean Patent Application No. 10-2019-0161635, filed on Dec. 6, 2019, the disclosure of which is incorporated by reference herein in its entirety.

BACKGROUND

1. Technical Field

The present disclosure relates to a vehicle providing rear passenger notification and a network system in communication with the vehicle.

2. Description of Related Art

Recently, of the number of deaths related to leaving an infant unattended in a vehicle has increased. The vehicle in which the infant has been left unattended typically provides a child identification device that allows an alarm sound to be output. However, the inside of a closed vehicle in summer or during warm temperature has high temperature which increases risk of injury to the infant.

In addition, during colder temperatures, the vehicle cabin may reach extreme low temperatures thus also increasing injury risk. Therefore, it is necessary to provide a technology of providing a neglect status to the driver and to secure the safety of the neglected passenger until the driver arrives. In other words, in the development of the vehicle, research into the technology required for securing the safety of the rear passengers is being actively conducted.

SUMMARY

An aspect of the disclosure provides a vehicle and a network system capable of rescuing a passenger by operating a vehicle air conditioning apparatus and transmitting a signal via the network when a passenger of the vehicle is left unattended.

In accordance with exemplary embodiments of the disclosure, a vehicle may include an output device; a communicator configured to communicate with a user terminal; an air conditioner; a sensor configured to obtain a movement of a passenger (e.g., a rear passenger) within the vehicle; and a controller configured to output an identification image through the output device when a movement signal of the passenger exceeds a reference signal after the vehicle doors are closed.

Further, the controller may be configured to output a horn signal through the output device when the movement signal of the passenger exceeds the reference signal after the vehicle doors are closed. The controller may be configured to transmit a warning signal to the user terminal and operate the air conditioner based on temperature information of the vehicle when the movement signal of the passenger exceeds the reference signal after the vehicle doors are closed. In addition, the controller may be configured to unlock the vehicle door when a predetermined authentication user terminal obtains the identification image.

In accordance with exemplary embodiments of the disclosure, a vehicle controlling method may include obtaining a movement of a passenger (e.g., a rear passenger) within the vehicle; and outputting an identification image through an output device when a movement signal of the passenger exceeds a reference signal after the vehicle doors are closed. The method may further include outputting a horn signal through the output device when the movement signal of the passenger exceeds the reference signal after the vehicle doors are closed.

Additionally, the method may include transmitting a warning signal to a user terminal and operating an air conditioner based on temperature information of the vehicle when the movement signal of the passenger exceeds the reference signal after the vehicle doors are closed. The method may further include unlocking the vehicle door when a predetermined authentication user terminal obtains the identification image.

In accordance with exemplary embodiments of the disclosure, a network system may include a user terminal; a server; and a vehicle configured to transmit a warning signal to the user terminal when a movement signal of the passenger exceeds a reference signal after the vehicle doors are closed. Further, the vehicle may be configured to output an identification image through the output device when a movement signal of the passenger exceeds the reference signal after the vehicle doors are closed.

Additionally, the server may be configured to transmit a rescue request signal including location information of the vehicle to a predetermined authentication user terminal, and unlock the door of the vehicle when a predetermined authentication user terminal obtains the identification image. The server may then be configured to derive user information corresponding to an unidentified user terminal and unlock the vehicle door based on the user information when the unidentified user terminal obtains the identification image.

BRIEF DESCRIPTION OF THE DRAWINGS

These and/or other aspects of the disclosure will become apparent and more readily appreciated from the following description of exemplary embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/controller refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following description, like reference numerals refer to like elements throughout the specification. This specification does not describe all elements of the embodiments, and in the technical field to which the present disclosure pertains, there is no overlap between the general contents or the embodiments. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components. It will be understood that when an element is referred to as being "connected" another element, it may be directly or indirectly connected to the other element, wherein the indirect connection includes "connection via a wireless communication network". The terms first, second, etc. are used to distinguish one component from another component, and the component is not limited by the terms described above.

An expression used in the singular encompasses the expression of the plural, unless it has a clearly different meaning in the context. The reference numerals used in operations are used for descriptive convenience and are not intended to describe the order of operations and the operations may be performed in a different order unless otherwise stated.

Hereinafter, embodiments of the present disclosure will be described with reference to the accompanying drawings.

Figure 1:
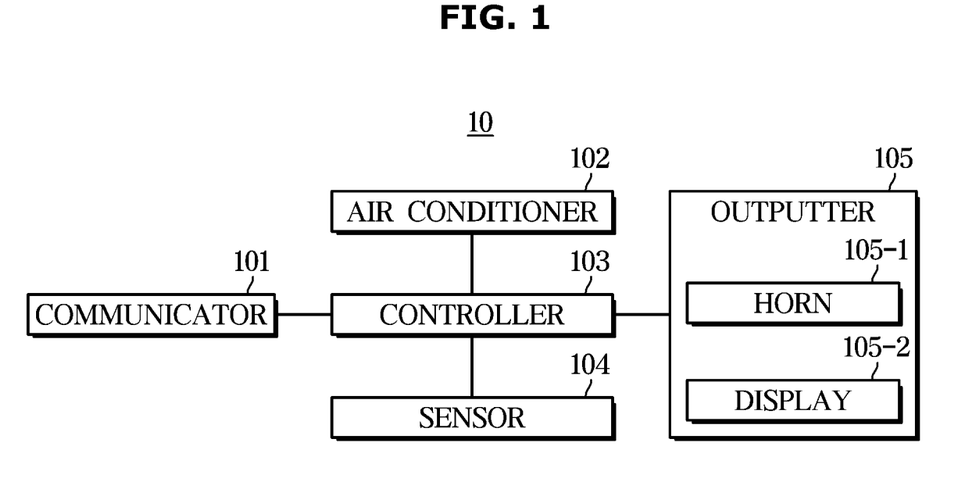
FIG. 1 is a diagram illustrating a control block diagram of a vehicle according to an exemplary embodiment.

FIG. 1 is a diagram illustrating a control block diagram of a vehicle according to an exemplary embodiment. Referring to FIG. 1, the vehicle may include an air conditioner 102, a communicator 101, a controller 103, a sensor 104, and an output device 105. The controller 103 may be configured to operate the other components of the vehicle.

The air conditioner 102 may be configured to maintain a particular environment in the interior of the vehicle by adjusting the temperature, humidity, air cleanliness, and air flow in the vehicle. In addition, the internal temperature may be transmitted to the controller via the vehicle network NT by the air conditioner 102. The controller may be configured to transfer the heat capacity required to be discharged based on the reference temperature to the air conditioner via the vehicle network NT.

The communicator 101 may be provided in a vehicle to communicate with a user terminal. The communicator 101 may include one or more components that enable communication with an external device, and may include, for example, at least one of a short range communication module, a wired communication module, and a wireless communication module. The short range communication module uses a wireless communication network in a short range such as a Bluetooth module, an infrared communication module, a radio frequency identification (RFID) communication module, a wireless local access network (WLAN) communication module, an NFC communication module, and a zigbee communication module. It may include various short-range communication module for transmitting and receiving.

Wired communication modules include a variety of wired devices, such as CAN (Module Area Network) modules, Local Area Network (LAN) modules, Wide Area Network (WAN) modules, or Value Added Network (VAN) modules. In addition to wired communication modules, various cable communications such as Universal Serial Bus (USB), High Definition Multimedia Interface (HDMI), Digital Visual Interface (DVI), reduced standard 232 (RS-232), power line communication, or plain old telephone service (POTS) may be included in the wired communication modules.

In addition to the Wi-Fi module and the wireless broadband module, the wireless communication module may include a global system for mobile communication (GSM), code division multiple access (CDMA), wideband code division multiple access (WCDMA), and universal mobile telecommunications system, and a wireless communication module supporting various wireless communication schemes such as time division multiple access (TDMA) and long term evolution (LTE).

The wireless communication module may include a wireless communication interface including an antenna for transmitting a signal and a transmitter. The wireless communication module may further include a signal conversion module configured to modulate the digital control signal output from the controller into an analog type wireless signal via the wireless communication interface under the operation of the controller. The wireless communication module may include a wireless communication interface including an antenna for receiving a signal and a receiver. The wireless communication module may further include a signal conversion module configured to demodulate an analog type wireless signal received via a wireless communication interface into a digital control signal.

The sensor 104 may be configured to obtain a movement of a passenger within the vehicle. The passenger described herein is referred to as a rear passenger. However, the present disclosure is not limited thereto and the passenger may be located anywhere within the vehicle. In particular, the sensor 104 may be configured to detect the movement in the vehicle using the Doppler effect. In response to detecting a movement, the sensor 104 may be configured to transmit a signal indicating whether a corresponding movement occurs to the controller via communication. The output device 105 may include a display 105-2 and a horn 105-1.

The display 105-2 may be a cathode ray tube (CRT), a digital light processing (DLP) panel, a plasma display penal, a liquid crystal display (LCD) panel, Electro luminescence (EL) panels, electrophoretic display (EPD) panels, electrochromic display (ECD) panels, light emitting diode (LED) panels, or organic light emitting diodes (Organic Light) Emitting Diode (OLED) panel, etc., but is not limited thereto. According to an exemplary embodiment, the display may be disposed in the windshield glass, and the controller may be configured to output the identification image to the windshield glass.

The horn 105-1 may be configured to output a horn signal based on the operation of the controller when the rear passenger's movement signal exceeds the reference signal. The controller 103 may be configured to transmit a warning signal to the user terminal when the rear passenger's movement signal exceeds the reference signal after the vehicle doors are closed, and operate the air conditioner based on the temperature information of the vehicle. The rear passenger's motion signal may be obtained based on the above-described sensor.

The controller 103 may be configured to operate the output device to output a horn signal in response to determining that the rear passenger's movement signal exceeds the reference signal after the vehicle doors are closed. The door closure may be detected by sensors mounted within the vehicle and in communication with the controller. In particular, the controller may be configured to output a horn signal using the horn of the output device. The controller 103 may be configured to output the identification image through an output device when the rear passenger's movement signal exceeds the reference signal after the vehicle doors are closed. According to an exemplary embodiment, the identification image may be provided as a QR code. When the predetermined authentication user terminal acquires the identification image, the controller 103 may be configured to unlock at least one of the doors of the vehicle. The predetermined authentication user terminal may refer to a user terminal of an authenticated user in the securing of a rear passenger such as a police officer and a firefighter.

The controller 103 may include a memory (not shown) configured to store data regarding an algorithm or a program that implements the algorithm for executing the operation of components in the vehicle, and a processor (not shown) using the data stored in the memory. The controller may be specifically programmed to execute the process described herein. In particular, the memory and the processor may be implemented as separate chips. Alternatively, the memory and the processor may be implemented in a single chip.

Figure 2:
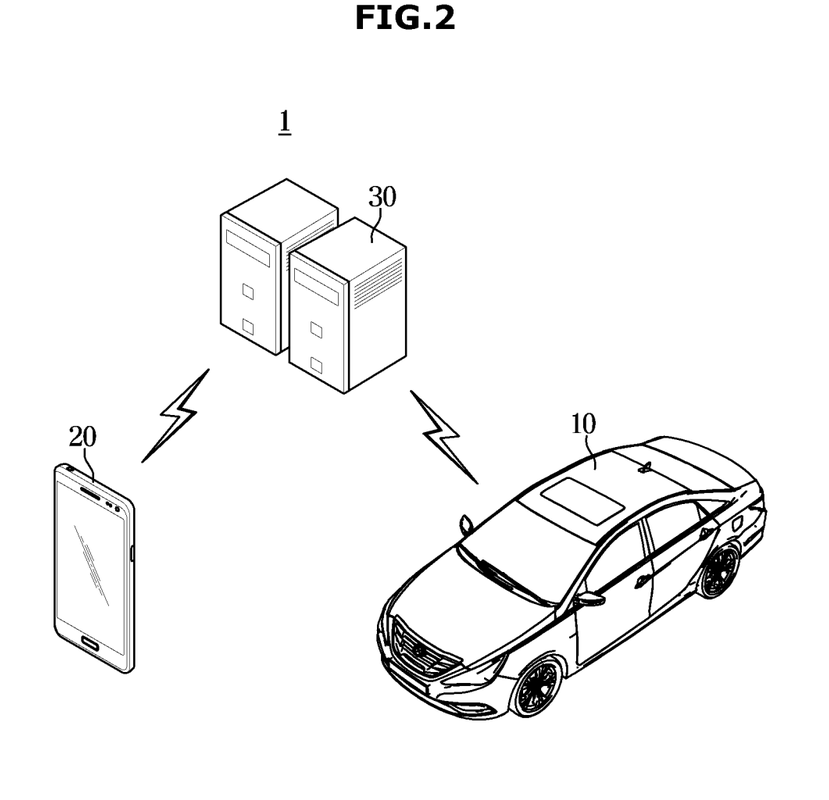
FIG. 2 is a diagram illustrating an operation of a network system according to an exemplary embodiment.

FIG. 2 is a diagram illustrating an operation of a network system according to an exemplary embodiment. The network system 1 according to an exemplary embodiment may include a user terminal 20, a server 30, and a vehicle 10.

The user terminal 20 may be implemented as a computer or a portable terminal in which the user terminal may access the (device) via a network. In particular, the computer may include a wireless communication devices based handheld for example, a laptop equipped with a web browser, a desktop, a laptop, a tablet PC, a slate PC, and the like, and the portable terminal is, for example, portable and mobile. As a guaranteed wireless communication device, PCS (Personal Communication System), GSM (Global System for Mobile communications), PDC (Personal Digital Cellular), PHS (Personal Handy phone System), PDA (Personal Digital Assistant), IMT (International Mobile Telecommunication))-2000, Code Division Multiple Access (CDMA)-2000, or Wireless Broadband Internet (WiBro) terminals, smart phones, etc. and wearable devices such as watches, rings, bracelets, anklets, necklaces, glasses, contact lenses, or head-mounted-devices (HMDs).

As described above, the vehicle 10 may be configured to output the identification image through an output device when the rear passenger's movement signal exceeds the reference signal after the vehicle doors are closed. In addition, the server 30 may be configured to transmit a rescue request signal that includes the location information of the vehicle to a predetermined authentication user terminal.

As described above, the authentication user terminal may refer to a user terminal capable of rescuing the rear passenger. The authentication user may also be configured to receive location information of the vehicle in response to receiving a rescue request signal for rescuing the rear passenger. Meanwhile, when the authentication user arrives at the vehicle (e.g., in response to detecting an approach of the authenticated user), the vehicle may be configured to output the identification image as described above. When the authentication user acquires the identification image, the server may be configured to unlock at least one door of the vehicle.

When the unidentified user terminal acquires the identification image, the server 30 may be configured to derive user information that corresponds to the unidentified user terminal. Meanwhile, in deriving information of an unidentified user, the server may be configured to communicate with another server to obtain information of the corresponding user. On the other hand, the server may be configured to execute the unlocking of the door of the vehicle in response to determining that rescue of the rear passengers is possible based on user information of the unidentified user. At least one component may be added or deleted to correspond to the performance of the components of the vehicle and network systems shown in FIGS. 1 and 2. In addition, it will be readily understood by those skilled in the art that the mutual position of the components may be changed corresponding to the performance or structure of the system.

Figure 3:
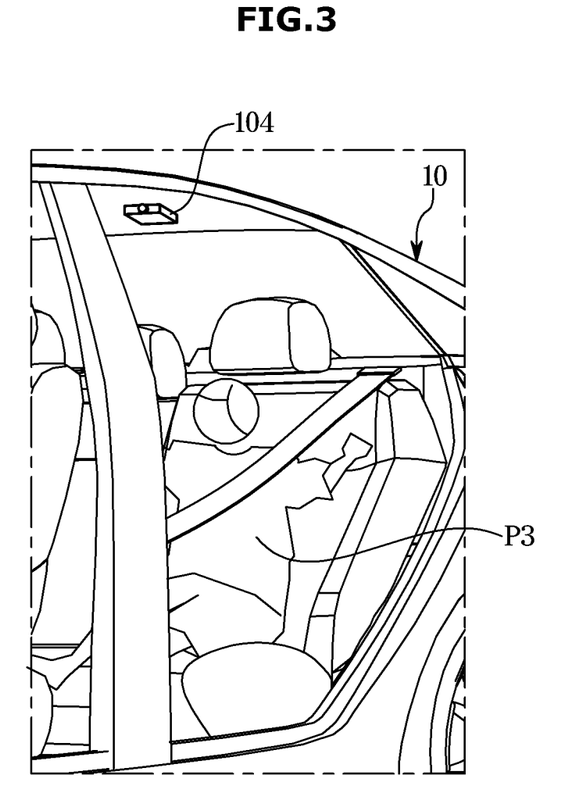
FIG. 3 is a view illustrating an operation of detecting a rear passenger according to an embodiment.

FIGS. 1 and 2 refer to hardware components such as software and/or Field Programmable Gate Array (FPGA) and Application Specific Integrated Circuit (ASIC). FIG. 3 is a view illustrating an operation of detecting a rear passenger according to an exemplary embodiment. Referring to FIG. 3, the rear passenger P3 does not exit the vehicle after the vehicle doors are closed. In particular, this determination may be made after a predetermined time elapses once all vehicle doors are closed.

In particular, when the vehicle doors are closed, the controller may be configured to operate the sensor 104 to start detecting the movement in the vehicle. The sensor 104 may include a transmitter and a receiver, and the sensor may be configured to detect movement in the vehicle using the Doppler effect. According to an exemplary embodiment, the sensor may be configured to restart indoor sensing after about a 10 second delay after the warning of about 25 seconds and detect movement of the rear passenger up to eight times in a row.

The controller may be configured to transmit a warning signal to the vehicle owner user terminal in response to determining that the movement signal of the rear passenger P3 exceeds the reference signal, and operate the air conditioner based on temperature information of the vehicle. In particular, when the rear passenger P3 is detected by the sensor 104, a remote start may be applied by the controller, and the controller may be configured to operate the air conditioning device to adjust the internal temperature of the vehicle to a predetermined temperature (based on whether the vehicle interior temperature is less than or greater than a predetermined threshold).

Figure 4:
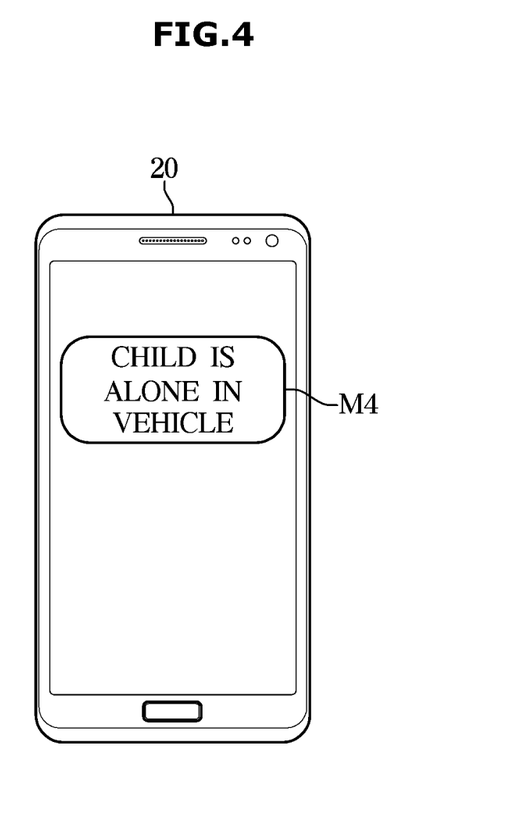
FIG. 4 is a diagram illustrating a warning signal output to a user terminal according to an exemplary embodiment.

Meanwhile, referring to FIGS. 3 and 4, an operation of outputting a warning message to the user terminal is illustrated. According to an exemplary embodiment the user terminal 20 may output a message such as "the child is alone in the car! (M4)". This operation may be performed via a telematics function, and further, as described below, the telematics server may be configured to execute the door lock and unlock of the doors of the vehicle.

Figure 5:
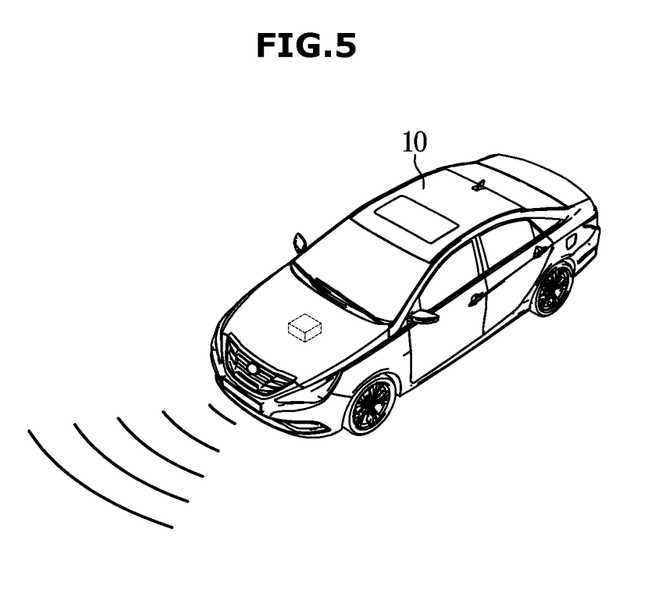
FIG. 5 is a diagram illustrating an operation of outputting a sound signal, according to an exemplary embodiment.

FIGS. 3 and 5 together, the controller may be configured to output a horn signal using a horn of the output device after motion detection stops when detecting indoor motion. On the other hand, the operation described in FIGS. 3 to 5 are merely an exemplary embodiment for explaining the operation of the present disclosure, there is no limitation to the operation of outputting a warning signal, an operation of the air conditioner and the horn signal transmitted to the user terminal.

Figure 6:
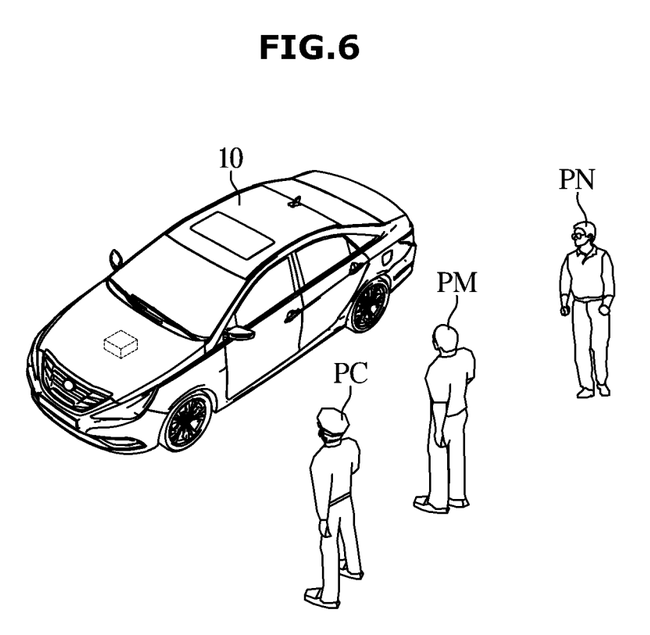
FIG. 6 is a diagram illustrating an operation of transmitting a warning signal, according to an exemplary embodiment.

Referring to FIG. 6, after the vehicle is closed, the operation of the server is described when the movement signal of the rear passenger exceeds the reference signal. First, the server may be configured to transmit a warning signal to the owner user terminal (PM) as described above. The server may be configured to unlock at least one door of the vehicle when a predetermined authentication user terminal (PC) acquires the identification image. The server may be configured to transmit a rescue request signal including the location information of the vehicle to a predetermined authentication user terminal. The server may be configured to unlock the door of the vehicle when a predetermined authentication user terminal acquires the identification image.

According to an exemplary embodiment, when accumulating four or more times of indoor movement motion notifications using information acquired by the sensor mounted within the vehicle, the server may be configured to determine that the rear passenger is left unattended. In response thereto, the server may be configured to transmit a location and rescue request signal together to the authentication user terminal vehicle.

In particular, the server may be configured to transmit a rescue request signal through an application distributed to police officers and firefighters. In addition, the server may be configured to transmit a rescue request signal to the police officer or firefighter in closest proximity to the vehicle based on the position information of the vehicle. For example, the server may be configured to transmit a rescue request signal through an application distributed to police officers and firefighters. In addition, the server may be configured to transmit a rescue request signal to the police officer or firefighter in closest proximity to the vehicle based on the location information of the vehicle.

Figure 7:
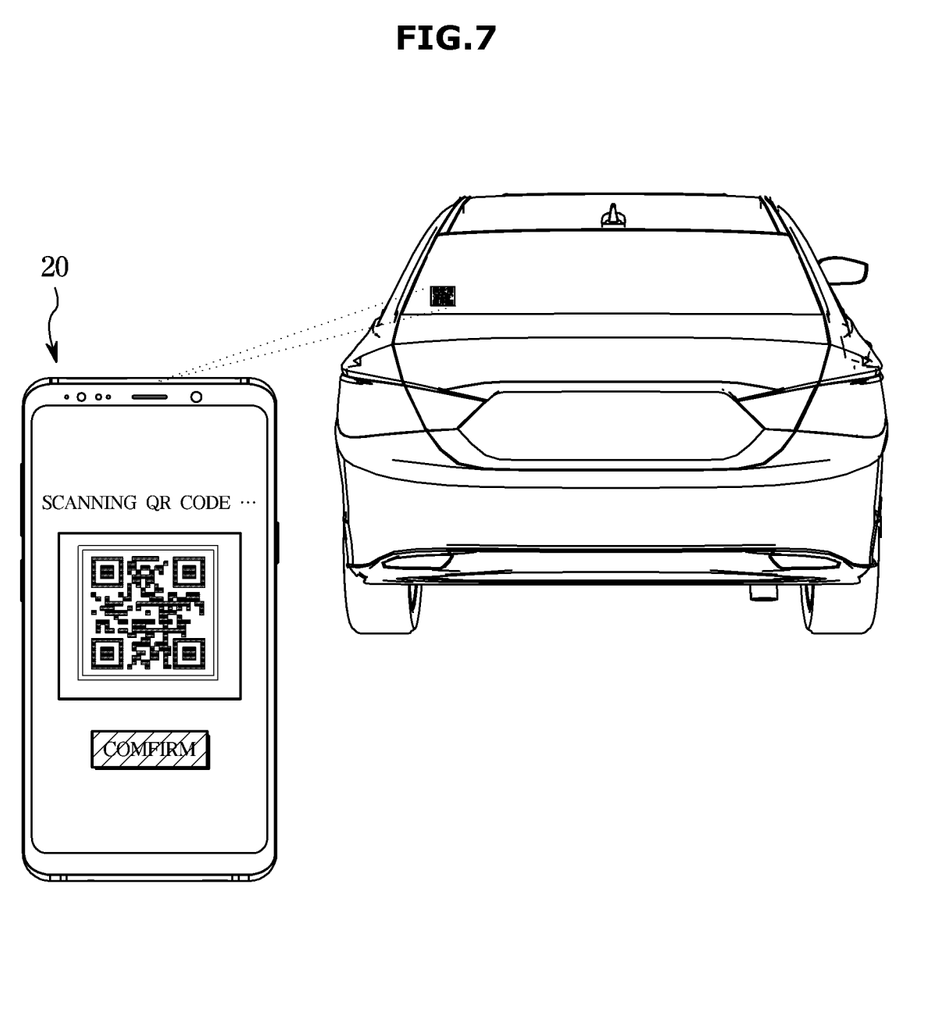
FIG. 7 is a diagram illustrating an operation of outputting an identification image to a display apparatus, according to an exemplary embodiment.
Figure 8:
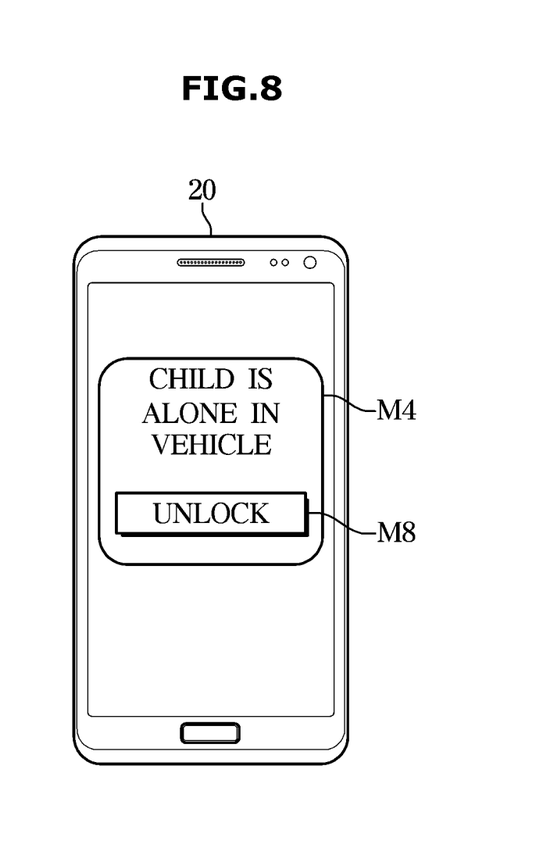
FIG. 8 is a diagram illustrating a lock release operation according to an exemplary embodiment.

FIGS. 6 and 7, the authentication user terminal PC may be configured to scan the identification image output by the vehicle using the application that receives the rescue signal. As described above, the identification image ID may be provided as a QR code. Referring to FIG. 8, the authentication user terminal may be configured to transmit the vehicle door unlock signal M8 to the server when the identification image is scanned. Further, the server may be configured to transmit the owner's telephone number together to the authentication user terminal. The authentication user PC may be configured to transmit the rescue complete message and the information of the rescued authenticated user to the borrower based thereon.

When the unidentified user terminal PN obtains the identification image, the server may be configured to derive information of the user that corresponds to the unidentified user terminal. The server may also be configured to unlock at least one door of the vehicle based on user information. Referring to FIG. 7 again, the vehicle may be configured to output the identification image through the output device 105-2 after the vehicle doors are closed when the motion signal of the rear passenger exceeds the reference signal. In particular, the vehicle may be configured to output the identification image ID provided with the disposable QR code onto the windshield glass 105-2.

Referring to FIGS. 6 to 8, when the unidentified user's terminal (PN) around the vehicle scans the QR code, the user's consent/crime inquiry agreement and door unlock request page for the unidentified user's terminal may be output to the server when the unidentified user's terminal is not displayed, and information of unidentified users may be transmitted when the unidentified user agrees. In other words, an authentication process may be executed to provide access to the vehicle. The server may be configured to transmit the transmitted unidentified user information and the vehicle location information to the police server. The server may be configured to transmit a door unlock signal of the vehicle to the vehicle when the police server determines that the person is a safe or authorized person. The server may be configured to transmit the borrower a message and an unidentified user's telephone number upon completion of the passenger rescue.

Figure 9:
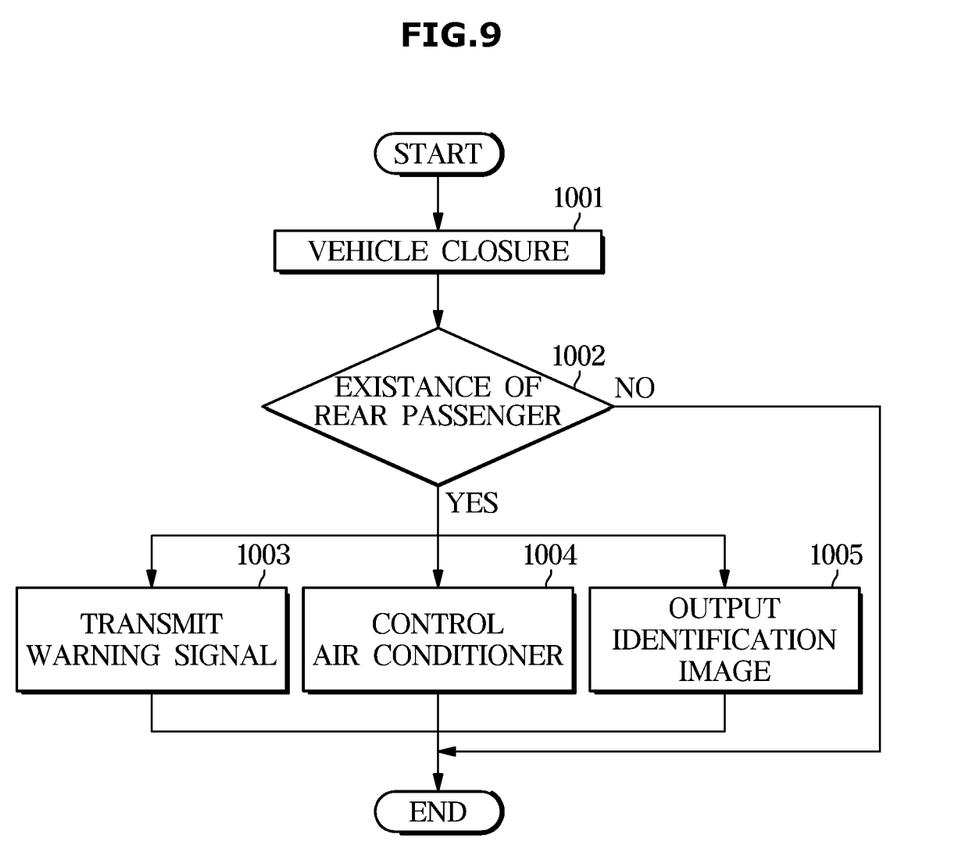
FIGS. 9 to 11 are flowcharts according to an exemplary embodiment.
Figure 10:
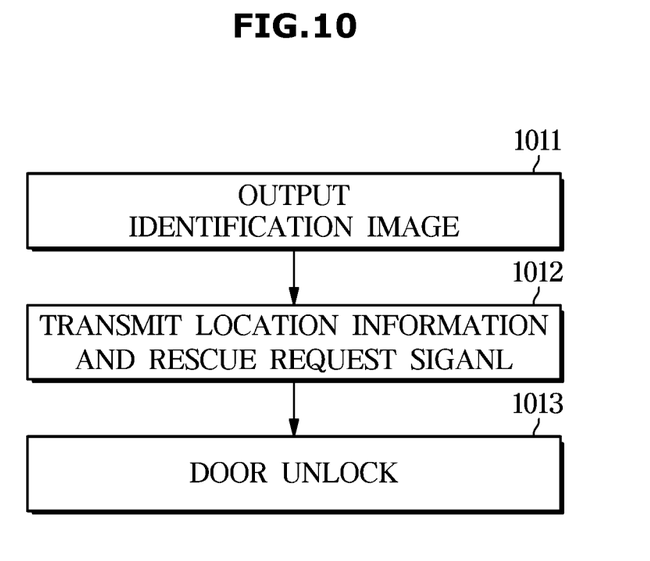

FIGS. 9 to 11 are flowcharts according to an exemplary embodiment. FIG. 9 is a flowchart illustrating an operation of a vehicle, according to an exemplary embodiment. In response to determining that the vehicle doors are closed (1001) and a rear passenger remains present within the vehicle (1002), the vehicle may be configured to transmit a warning signal to the user terminal (1003). The vehicle may also be configured to operate the air conditioner (1004). The vehicle may be configured to output the identification image including the QR code to the output device (1005). FIG. 10 is a flowchart illustrating an operation in the case of a rescue request to a predetermined authenticated user.

In response to determining that the vehicle doors are closed and the rear passenger remains within the vehicle, the vehicle may be configured to output an identification image to the output device of the vehicle (1011). In addition, the vehicle may be configured to transmit the location information and the rescue request signal to the authenticated user terminal through the server (1012). The server may be configured to unlock at least one door of the vehicle since the authenticated user terminal has authorization to assist in the rear passenger rescue (1013).

Figure 11:
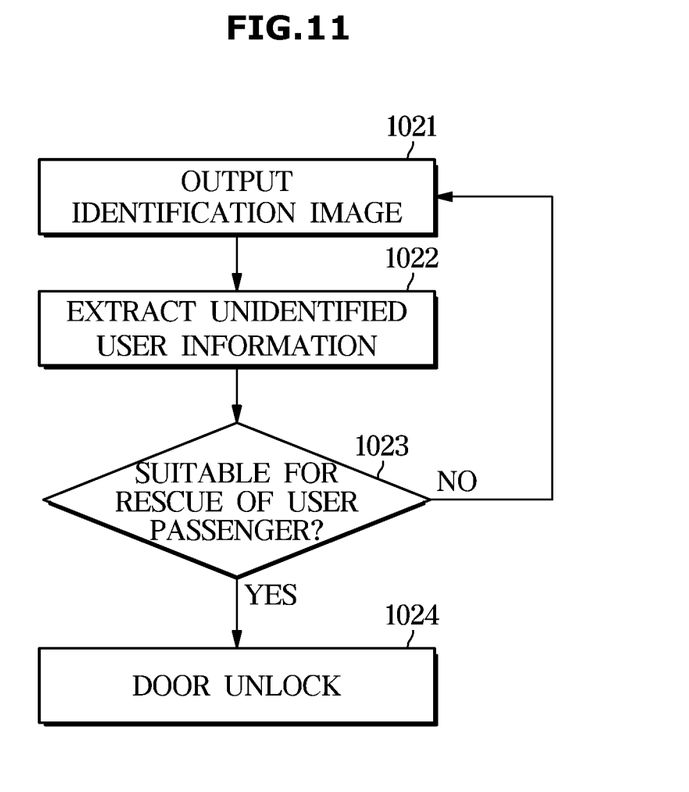

FIG. 11 is a flowchart showing an operation in the case of a rescue request to an unidentified user. Referring to FIG. 11, when a vehicle is closed and a rear passenger exists, the vehicle may be configured to output an identification image to the output device of the vehicle (1021). The server may be configured to derive information about the unknown user. The server may be configured to unlock the door of the vehicle (1024) when the unidentified user is authorized as the user passenger rescue (1023).

On the other hand, the disclosed exemplary embodiments may be implemented in the form of a recording medium for storing instructions executable by a computer. Instructions may be stored in the form of program code, and when executed by a processor, may be configured to generate a program module to perform the operations of the disclosed embodiments. The recording medium may be implemented as a non-transitory computer-readable recording medium. The non-transitory computer-readable recording media include all types of recording media having stored thereon instructions which may be read by a computer. For example, there may be a read only memory (ROM), a random access memory (RAM), a magnetic tape, a magnetic disk, a flash memory, an optical data storage device, or the like.

As described above, the disclosed exemplary embodiments have been described with reference to the accompanying drawings. Those skilled in the art will understand that the present disclosure may be implemented in a form different from the disclosed exemplary embodiments without changing the technical spirit or essential features of the present disclosure. The disclosed exemplary embodiments are exemplary and should not be construed as limiting.

It is an aspect of the disclosure to provide a vehicle and network system may operate the air conditioning apparatus of the vehicle when the rear passenger of the vehicle is left unattended within a vehicle and transmit a signal via the network to rescue the rear passenger, thereby ensuring passenger safety.

DESCRIPTION OF SYMBOLS

1: network system
10: vehicle
101: communicator
102: air conditioner
103: controller
104: sensor
105: output device

What is claimed is:

1. A vehicle comprising:
an output device mounted within the vehicle and including a horn and a display disposed in a windshield glass;
a communicator configured to communicate with a user terminal;
an air conditioner mounted within the vehicle;
a sensor configured to obtain a movement of a passenger within the vehicle; and
a controller configured to control the display to output an identification image including a disposable QR code in response to determining that a movement signal of the passenger exceeds a reference signal after detecting that vehicle doors are closed.

2. The vehicle of claim 1, wherein the controller is configured to control the horn to output a horn signal in response to determining that the movement signal of the passenger exceeds the reference signal after the vehicle doors are closed.

3. The vehicle of claim 1, wherein the controller is configured to transmit a warning signal to the user terminal and operate the air conditioner based on temperature information of the vehicle in response to determining that the movement signal of the passenger exceeds the reference signal after the vehicle doors are closed.

4. The vehicle of claim 1, wherein the controller is configured to unlock at least one of the vehicle doors when a predetermined authentication user terminal obtains the identification image.

5. A method for controlling a vehicle, the vehicle includes a horn and a display disposed in a windshield glass, comprising:
obtaining, by a controller, a movement of a passenger within the vehicle using a sensor; and
controlling the display, by the controller, to output an identification image including a disposable OR code in response to determining that a movement signal of the passenger exceeds a reference signal after vehicle doors are closed.

6. The method of claim 5 further comprising:
controlling the horn to output a horn signal when the movement signal of the rear passenger exceeds the reference signal after the vehicle is closed.

7. The method of claim 5, further comprising:
transmitting, by the controller, a warning signal to a user terminal and operating an air conditioner based on temperature information of the vehicle in response to determining that the movement signal of the passenger exceeds the reference signal after the vehicle doors are closed.

8. The method of claim 7, further comprising:
unlocking, by the controller, at least one of the vehicle doors when a predetermined authentication user terminal obtains the identification image.

9. A network system, comprising:
a user terminal,
a server; and
a vehicle configured to transmit a warning signal to the user terminal in response to determining that a movement signal of a passenger exceeds a reference signal after vehicle doors are detected to be closed,
wherein the vehicle includes a horn and a display disposed in a windshield glass, and
the vehicle is configured to control the display to output an identification image including a disposable QR code, in response to determining that a movement signal of the passenger exceeds the reference signal after the vehicle doors are closed.

10. The network system of claim 9, wherein the server is configured to transmit a rescue request signal including location information of the vehicle to a predetermined authentication user terminal, and unlock at least one door of the vehicle when a predetermined authentication user terminal obtains the identification image.

11. The network system of claim 10, wherein the server is configured to derive user information corresponding to an unidentified user terminal and operate the vehicle door to be unlocked based on the user information when the unidentified user terminal obtains the identification image.

* * * * *